US 7,406,372 B2

(12) United States Patent  (10) Patent No.: US 7,406,372 B2
Kim et al.  (45) Date of Patent: Jul. 29, 2008

(54) METHOD FOR CONTROLLING VARIABLE DAMPER IN VEHICLE

(75) Inventors: Jong Heon Kim, Seoul (KR); Wan Il Kim, Gyeonggi-do (KR)

(73) Assignee: Mando Corporation, Seoul (KR)

( * ) Notice: Subject to any disclaimer, the term of this patent is extended or adjusted under 35 U.S.C. 154(b) by 128 days.

(21) Appl. No.: 11/283,992

(22) Filed: Nov. 22, 2005

(65) Prior Publication Data

US 2006/0136107 A1  Jun. 22, 2006

(30) Foreign Application Priority Data

Nov. 22, 2004  (KR) ............... 10-2004-0095698

(51) Int. Cl.
*B60G 21/045* (2006.01)
*B60G 21/067* (2006.01)
*B60G 23/00* (2006.01)
*G06F 17/00* (2006.01)

(52) U.S. Cl. ..................... 701/38; 280/5.504
(58) Field of Classification Search ............ 701/29, 701/36, 37, 38; 180/902; 280/5.5, 5.504, 280/5.505, 5.506, 5.507, 5.513, 5.514, 5.515, 280/5.517

See application file for complete search history.

(56) References Cited

U.S. PATENT DOCUMENTS

| 4,756,549 A |   | 7/1988 | Kurosawa et al. |
| 4,838,547 A | * | 6/1989 | Sterling ..................... 482/128 |
| 4,949,262 A | * | 8/1990 | Buma et al. .................. 701/37 |
| 5,085,458 A | * | 2/1992 | Kii et al. ................. 280/5.506 |
| 5,193,845 A | * | 3/1993 | Yokote et al. ............ 280/5.503 |
| 5,199,737 A | * | 4/1993 | Huang .................... 280/5.512 |

(Continued)

Primary Examiner—Jack W Keith
Assistant Examiner—Edward Pipala
(74) Attorney, Agent, or Firm—McDermott Will & Emery LLP

(57) ABSTRACT

The present invention relates to a method of controlling a variable damper in a vehicle wherein a rear-wheel variable damper can be controlled by estimating a vertical acceleration value of a rear wheel based on the fact that there is a certain time delay in a wheel motion between front and rear wheels due to the wheelbase and vehicle speed. To this end, the method of the present invention comprises the steps of (a) detecting vehicle body accelerations other than a desired vehicle body acceleration of a vehicle body; (b) calculating the desired vehicle body acceleration based on the other detected vehicle body accelerations according to a geometric rule; (c) calculating vehicle body vertical velocities by filtering the vehicle body accelerations to eliminate DC offsets therefrom and integrating the filtered accelerations; (d) detecting accelerations of front right/left vehicle wheels; (e) calculating front wheel vertical velocities by filtering the detected accelerations of the front right/left wheels to eliminate DC offsets therefrom and integrating the filtered accelerations, and then calculating accelerations of rear wheels by time delaying the accelerations of the front wheels by a time interval taken while a road input to the front wheel is delivered to the rear wheel at a vehicle speed; and (f) calculating damper velocities based on the calculated vehicle body vertical velocities and the calculated vehicle wheel vertical velocities. Accordingly, the Sky-hook determination can be more accurately made. Further, since it is not necessary to use all the four sensors, the number of parts of vehicles can be reduced when mass-producing the vehicles. Consequently, the selling prices for finished vehicles can be lowered, and thus, an unnecessary economical burden cannot be imposed on the consumers.

1 Claim, 3 Drawing Sheets

U.S. PATENT DOCUMENTS

| | | | |
|---|---|---|---|
| 5,410,482 A * | 4/1995 | Kimura et al. | 701/37 |
| 5,488,556 A * | 1/1996 | Sasaki | 701/37 |
| 5,510,988 A * | 4/1996 | Majeed et al. | 701/37 |
| 5,802,478 A * | 9/1998 | Iwasaki | 701/37 |
| 5,808,890 A * | 9/1998 | Sasaki | 701/37 |
| 5,832,398 A | 11/1998 | Sasaki et al. | |
| 5,950,776 A * | 9/1999 | Iwasaki et al. | 188/266.1 |
| 6,366,841 B1 * | 4/2002 | Ohsaku | 701/37 |

* cited by examiner

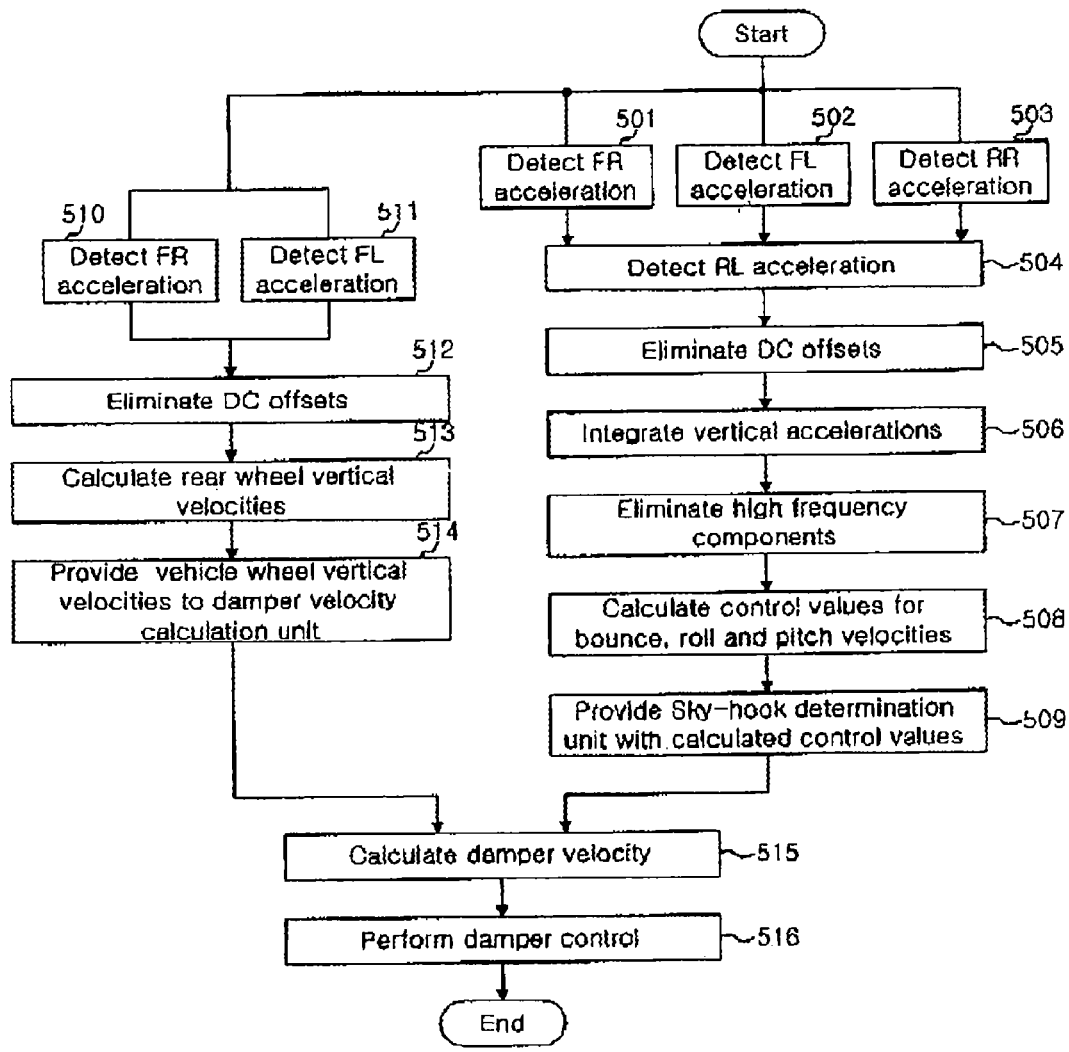

METHOD FOR CONTROLLING VARIABLE DAMPER IN VEHICLE

BACKGROUND OF THE INVENTION

1. Field of Invention

The present invention relates to a method for controlling a variable damper in a vehicle, and more particularly, to a method for controlling a continuously variable damper for a vehicle wherein only a front-wheel G sensor can be used to estimate a vertical acceleration value of a rear wheel in a state where a rear-wheel G sensor is removed.

2. Description of the Prior Art

In general, a vehicle suspension system is an important device for connecting a vehicle axle and body and absorbing vibration or shock exerted from a road surface to a vehicle axle to prevent the shock from being transferred directly to the vehicle body. This device provides the following three major functions.

First, the vehicle suspension system provides a passenger with ride comfort by effectively eliminate an irregular input generated from a road surface while a vehicle is traveling. Second, an improved handling performance can be provided by controlling the shaking of a vehicle generated by the driving activity or road unevenness. Third, vehicle stability when a vehicle is cornering, braking and accelerating can be provided by keeping vertical load on a tire contact surface when the vehicle is traveling on an irregular road surface.

In order to detect a motion of a vehicle body, such a vehicle suspension system includes vertical and longitudinal acceleration sensors installed at positions on a vehicle body above respective wheels, ride height sensors installed at the vehicle body to detect the vertical displacement of the suspension system, and four G sensors installed at a variable damper to detect the vertical acceleration of the vehicle body and wheels. Further, the suspension system utilizes auxiliary signals including vehicle speed signals, braking signals, steering angle signals and the like in order to properly perform the suspension control.

In addition, in order to perform the suspension control, the MCU receives signals from the respective sensors in the suspension system, applies the received signals to a control algorithm to calculate a suspension force required in respective hydraulic cylinders, and then outputs voltage signals to a voltage amplifier for actuating pressure control valves.

In particular, the four respective G sensors of the variable damper (shown in FIG. 1) installed at the vehicle body and wheels among the components of the suspension system are sensors for implementing the Sky-hook control which corresponds to a basic principle used in a ride control of the continuous damping control system (CDS)

That is, the term 'Sky-hook' is used to illustrate the concept that a vehicle is mounted to a virtual sky over the vehicle by means of a damper having a fixed damping coefficient, but this concept cannot be actually implemented. Therefore, the substantially same vibration isolation effect as in the Sky-hook control can be achieved by employing a damper with a damping coefficient that can continuously vary according to the vehicle behavior.

As shown in FIG. 2, the vertical velocity Vs of a vehicle and the vertical velocity Vu of a wheel are required to achieve this vibration isolation effect. That is, the four G sensors capable of measuring the vertical velocity and acceleration are installed at the vehicle body and wheels, respectively, such that the desired respective vertical velocity can be obtained by integrating the signals received from the installed G sensors.

Therefore, in the case of the four, i.e. front/rear and left/right, G sensors installed at the vehicle body, their three points can be positioned on a single plane in a mathematical view. Thus, even though one sensor is eliminated, signals from only the other three G sensors can be used to estimate the vertical acceleration of the position where the G sensor is eliminated. Accordingly, it does not matter to the implementation of the Sky-hook control.

However, since the four, i.e. front/rear and left/right, G sensors installed at the vehicle wheel are subjected to an independent suspension mode and an independent motion, the four sensors cannot be positioned on a single plane. As a result, since all the four sensors should be used to implement the Sky-hook control, the number of parts of vehicles cannot be reduced when mass-producing the vehicles. Accordingly, there is a problem in that a cost for a finished vehicle will be increased and an unnecessary economical burden may thus be imposed on the consumer.

SUMMARY OF THE INVENTION

Accordingly, the present invention is conceived to solve the aforementioned problems in the prior art. An object of the present invention is to provide a method of controlling a variable damper in a vehicle wherein a rear-wheel variable damper can be controlled by estimating a vertical acceleration value of a rear wheel based on the fact that there is a certain time delay in a wheel motion between front and rear wheels due to the wheelbase and vehicle speed.

According to an aspect of the present invention for achieving the object, there is provided a method of controlling a variable damper, which comprises the steps of (a) detecting vehicle body accelerations other than a desired vehicle body acceleration of a vehicle body; (b) calculating the desired vehicle body acceleration based on the other detected vehicle body accelerations according to a geometric rule; (c) calculating vehicle body vertical velocities by filtering the vehicle body accelerations to eliminate DC offsets therefrom and integrating the filtered accelerations; (d) detecting accelerations of front right/left vehicle wheels; (e) calculating front wheel vertical velocities by filtering the detected accelerations of the front right/left wheels to eliminate DC offsets therefrom and integrating the filtered accelerations, and then calculating accelerations of rear wheels by time delaying the accelerations of the front wheels by a time interval taken while a road input to the front wheel is delivered to the rear wheel at a vehicle speed; and (f) calculating damper velocities based on the calculated vehicle body vertical velocities and the calculated vehicle wheel vertical velocities.

BRIEF DESCRIPTION OF THE DRAWINGS

The above and other objects, features and advantages of the present invention will become apparent from the following description of a preferred embodiment given in conjunction with the accompanying drawings, in which:

FIG. 4 is a table used to determine whether to perform a final control in response to a motion of a vehicle body and damper according to the present invention; and FIG. 5 is a flowchart illustrating the method of controlling a variable damper for a vehicle according to the present invention.

DETAILED DESCRIPTION OF THE PREFERRED EMBODIMENT

A plurality of preferred embodiments of the present invention may be presented. Hereinafter, a preferred embodiment of the present invention will be described in detail with reference to the accompanying drawings. Those skilled in the art will be able to easily understand the above and other objects, features and advantages of the present invention through the preferred embodiment of the present invention.

Figure 1:
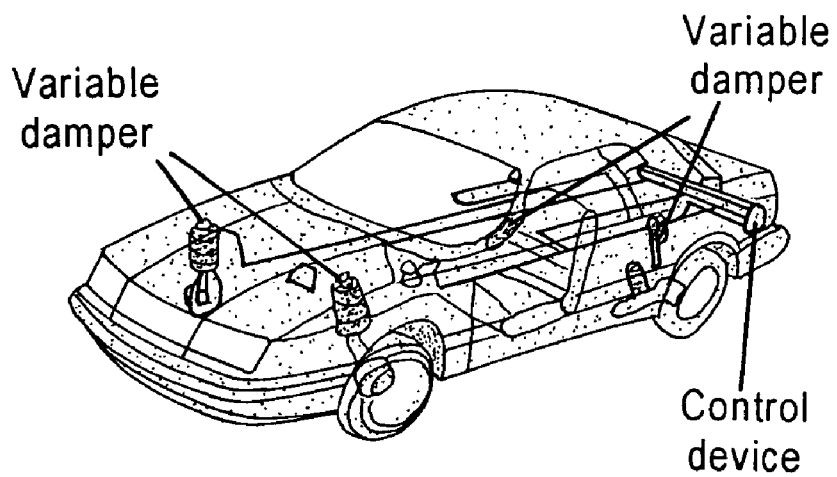
FIG. 1 shows a variable damper mounted to a vehicle.
Figure 2:
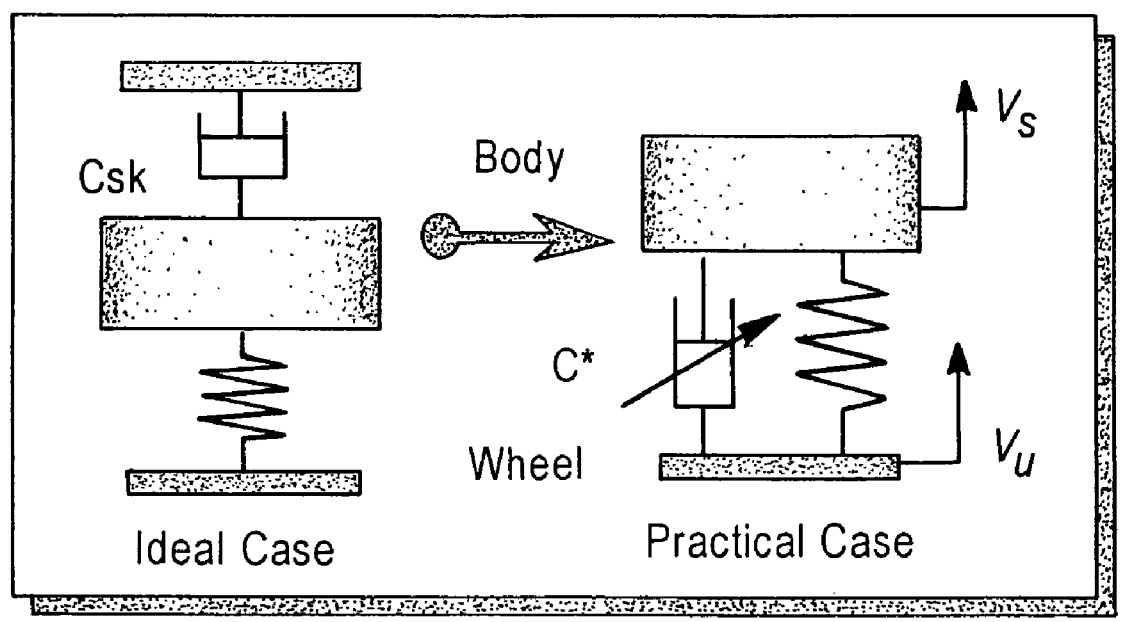
FIG. 2 is a diagram illustrating the relationship between a vertical velocity of a vehicle Vs and a vertical velocity of a wheel Vu.
Figure 3:
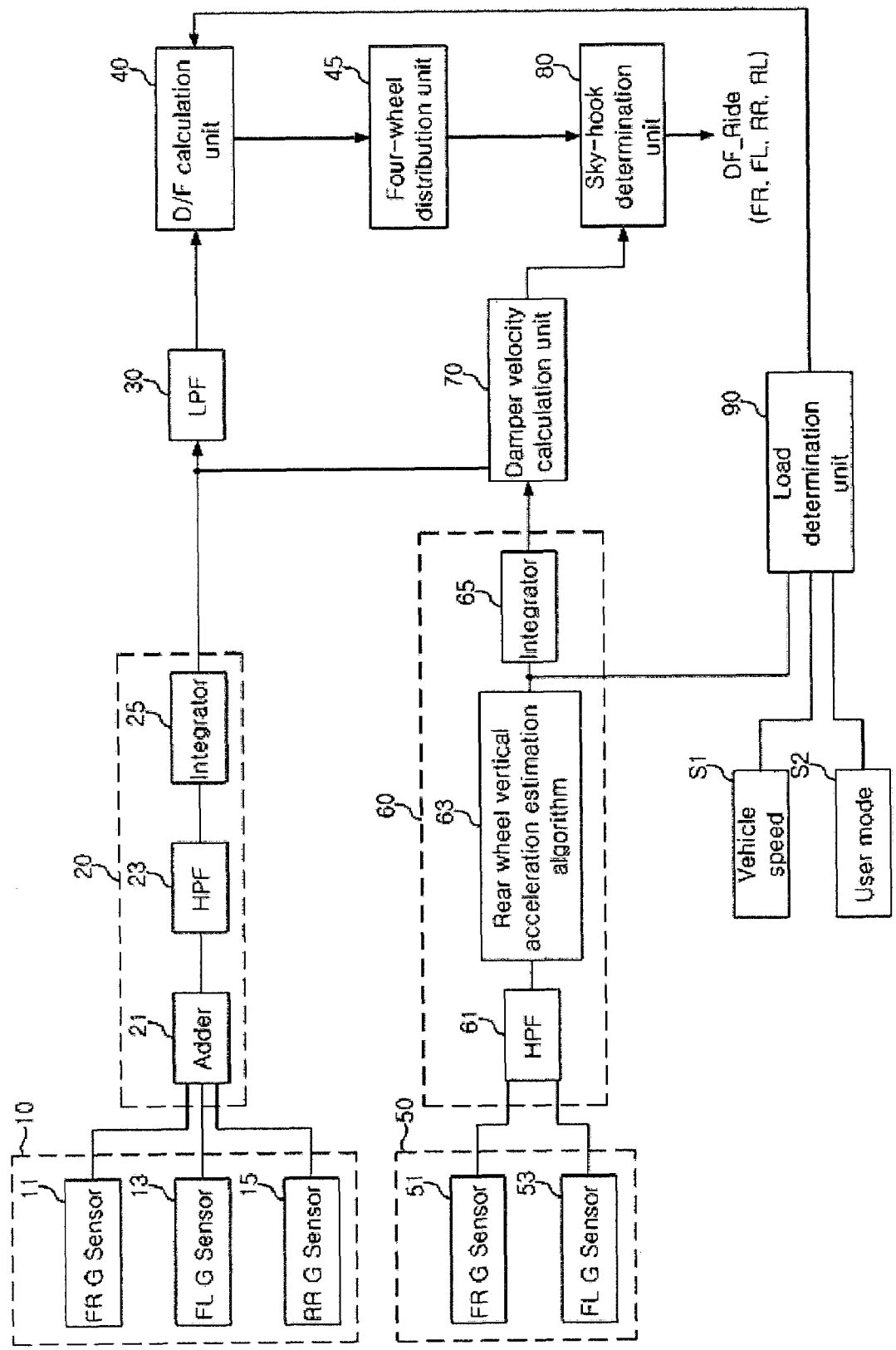
FIG. 3 is a block diagram illustrating s system for implementing a method of controlling a variable damper for a vehicle according to the present invention.

FIG. 3 is a block diagram illustrating a method of controlling a variable damper in a vehicle according to the present invention. Referring to FIG. 3, a system for controlling a variable damper according to the present invention comprises a vehicle body sensor unit 10, a vehicle body vertical velocity calculation unit 20, a low pass filter (LPF) 30, a D/F calculation unit 40, a four-wheel distribution unit 45, a vehicle wheel sensor unto 50, a vehicle wheel vertical velocity calculation unit 60, a damper velocity calculation unit 70, a Sky-hook determination unit 80, and a load determination unit 90.

The vehicle body sensor unit 10 is configured to output a voltage from 0 to 5 V. In particular, an arbitrary voltage (e.g., 2.5 V) is outputted when a vehicle is stationary. At this time, it is expressed as IG of a vertical acceleration of gravity at the ground. The vehicle body sensor unit 10 includes a FR G sensor 11 installed at a front right side of the vehicle body to detect the vertical acceleration, a FL G sensor 13 installed at a front left side of the vehicle body to detect the vertical acceleration and a RR G sensor 15 installed at a rear right side of the vehicle body to detect the vertical acceleration. Further, the vehicle body sensor unit transfers the detected FR, FL and RR accelerations to an adder 21 in the vehicle body vertical velocity calculation unit 20.

The vehicle body vertical velocity calculation unit 20 includes the adder 21, a high pass filter (HPF) 23, and an integrator 25. The adder 21 receives the FR, FL and RR accelerations detected, respectively, by the FR, FL and RR G sensors 11, 13 and 15 in the vehicle body sensor unit 10, estimates the other remaining RL acceleration according to a geometric rule that one surface is defined by three points, and then provides the estimated RL acceleration to the HPF 23.

The HPF 23 receives the vertical accelerations, i.e. the FR, FL, RR and RL accelerations, from the adder 21 and then performs the filtering operations for eliminating DC offsets from the respective received vertical accelerations to transfer the resultant accelerations to the integrator 25.

The integrator 25 calculates vehicle body vertical velocities by integrating the respective vertical accelerations, i.e. FR, FL, RR and RL accelerations, from which the DC offsets have been previously eliminated by the HPF 23, and then transfers the calculated vertical velocities to the LPF 30 and the damper velocity calculation unit 70.

The LPF 30 calculates three bounce, roll and pitch velocities based on the FR, FL, RR and RL velocities, eliminates high frequency components from the calculated velocities and then transfers the resultant velocities to the D/F calculation unit 40.

The D/F calculation unit 40 multiplies the bounce, roll and pitch velocities, from which the high frequency components are eliminated by the LPF 30, by control parameters (i.e., road surface conditions and vehicle speed) provided from the load determination unit 90 to calculate control values for the respective bounce, roll and pitch velocities and then to provide the calculated control values to the four-wheel distribution unit 45.

The four-wheel distribution unit 45 distributes control values for the bounce, roll and pitch velocities calculated by the D/F calculation unit 40 to the four dampers in such a manner that the control value for the FR damper is calculated by the equation, i.e. bounce value (bounce velocity×bounce gain)+roll value (roll velocity×roll gain)+pitch value (pitch velocity×pitch gain), the control value for the FL damper is calculated by the equation, i.e. bounce value−roll value+pitch value, the control value for the RR damper is calculated by the equation, i.e. bounce value+roll value−pitch value, and the control value for the RL damper is calculated by the equation, i.e. bounce value−roll value−pitch value. Then, the distribution unit 45 transfers the calculated control values for the respective dampers to the Sky-hook determination unit 80.

The vehicle wheel sensor unit 50 is configured to output a voltage from 0 to 5 V. In particular, an arbitrary voltage (e.g., 2.5 V) is outputted when a vehicle is stationary. In such a case, although the vehicle acceleration measured at the vehicle body is set to be 0.5 G/1V, the vertical acceleration of gravity measured at the vehicle wheel for the same road input as the vehicle body should be expressed as 5 G/1V because the vehicle wheel is lighter than the vehicle body. The vehicle wheel sensor unit 50 includes a FR G sensor 51 installed at the front right wheel to detect the vertical acceleration and a FL G sensor 53 installed at the front left wheel to detect the vertical acceleration, and transfers the detected FR and FL accelerations to the HPF 61 in the vehicle wheel vertical velocity calculation unit 60.

The vehicle wheel vertical velocity calculation unit 60 includes the HPF 61, an algorithm 63 for estimating the vertical acceleration of the rear wheels, and an integrator 65 (←63). The HPF 61 receives the vertical accelerations, i.e. the FR and FL accelerations, from the vehicle wheel sensor unit 50 and performs the filtering operations for eliminating DC offsets from the respective received vertical accelerations to transfer the resultant accelerations to the vertical acceleration estimation algorithm 63.

The rear wheel vertical acceleration estimation algorithm 63 estimates the vertical RR and RL accelerations using the vertical FR and FL accelerations, which have been filtered to eliminate the DC offsets by the HPF 61, and then transfers the estimated vertical RR and RL accelerations to the integrator 65.

The integrator 65 calculates vehicle wheel vertical velocities by integrating the vertical RR and RL accelerations, which have been estimated by the rear wheel vertical acceleration estimation algorithm 63, and the high-pass filtered vertical FR and FL accelerations, and then transfers the calculated vertical velocities to the damper velocity calculation unit 70.

The damper velocity calculation unit 70 receives the vehicle body vertical velocities integrated by the integrator 25 in the vehicle body vertical velocity calculation unit 20 and the vehicle wheel vertical velocities integrated by the integrator 65 in the vehicle wheel vertical velocity calculation unit 60, and then calculates damper velocities according to the following equation (1) to transfer the calculated damper velocities to the Sky-hook determination unit 80.

$$\text{(damper velocity)} = \text{(vehicle body vertical velocity)} - \text{(vehicle wheel vertical velocity)} \tag{1}$$

The Sky-hook determination unit 80 determines resultant control values based on the damper velocities provided form the damper velocity calculation unit 70 and the control values for the respective dampers distributed by the four-wheel distribution unit 45. Then, as shown in FIG. 4, the resultant control values are provided to the dampers to perform the damper control only when the dampers are extended such that the vehicle body is raised or the dampers are compressed such that the vehicle body is lowered.

The method of controlling a variable damper in a vehicle according to the present invention will be described in detail based on the foregoing configuration with reference to the flowchart of FIG. 5.

First, the FR G sensor 11 in the vehicle body sensor unit 10 is installed at the front right side of the vehicle body to detect the vertical FR acceleration and provides the detected FR acceleration to the adder 21 in the vehicle body vertical velocity calculation unit 20 (step 501). The FL G sensor 13 is installed at the front left side of the vehicle body to detect the vertical FR acceleration and provides the detected FL acceleration to the adder 21 (step 502). Further, the RR G sensor is installed at the rear right side of the vehicle body to detect the vertical RR acceleration and provides the detected RR acceleration to the adder 21 (step 503).

The adder 21 receives the FR, FL and RR accelerations detected by the FR, FL and RR G sensors 11, 13 and 15, respectively, and estimates the other remaining RR acceleration according to the geometric rule that one surface is defined by three points, and then provides the detected and estimated accelerations to the HPF 23 (step 504). Here, the RL acceleration may be estimated by using at least one of the FR, FL and RR accelerations detected by the FR, FL and RR G sensors 11, 13 and 15, respectively. Furthermore, the RL acceleration may be estimated by using at least two of the FR, FL and RR accelerations detected by the FR, FL and RR G sensors 11, 13 and 15, respectively.

The HPF 23 receives the vertical accelerations, i.e. the FR, FL, RR and RL accelerations, from the adder 21 and then performs the filtering operations for eliminating the DC offsets from the respective received vertical accelerations to transfer the resultant accelerations to the integrator 25 (step 505). The reason that the DC offsets should be eliminated is as follows. Even though the vehicle body sensor unit 10 should be installed upright at the vehicle, it may be often installed inclined due to difficulty in installing the sensor unit to the actual vehicle. In such a case, since a basic output value becomes 2.5V corresponding to 1 G, the acceleration value having a reference value of zero (0) should be subtracted by 2.5V from a value output from the sensor. However, since the basic value does not still become zero (0) at a basic state even though 2.5V is subtracted from the value output from the sensor, all the DC offsets should be eliminated such that the basic value can be zero at the basic state. Furthermore, since the DC offsets are almost constant and the sum of the very small low frequency components, they can be eliminated using a high pass filter with a cutoff frequency of 0.1 Hz.

The integrator 25 calculates the vehicle body vertical velocities by integrating the respective vertical accelerations, i.e. FR, FL, RR and RL accelerations, from which the DC offsets have been previously eliminated by the HPF 23, and then transfers the calculated vertical velocities to the LPF 30 and the damper velocity calculation unit 70 (step 506).

The LPF 30 calculates the three bounce, roll and pitch velocities based on the FR, FL, RR and RL velocities, eliminates high frequency components from the calculated velocities and then transfers the resultant velocities to the D/F calculation unit 40 (step 507). The reason that the high frequency components are eliminated is as follows. Since a control range of a semi-active damper is around 1 Hz, the response characteristics of the damper for higher frequency components are lowered due to the characteristics of the oil damper. Therefore, the ride comfort is further deteriorated due to inharmonious response timing. Accordingly, the LPF with a cutoff frequency of about 1.3 Hz may be used to eliminate the higher frequency components.

The D/F calculation unit 40 multiplies the bounce, roll and pitch velocities, from which the high frequency components are eliminated by the LPF 30, by the control parameters (i.e., road surface conditions and vehicle speed) provided from the load determination unit 90 to calculate the control values for the respective bounce, roll and pitch velocities and then to provide the calculated control values to the four-wheel distribution unit 45 (step 508).

The four-wheel distribution unit 45 distributes the control values for the bounce, roll and pitch velocities calculated by the D/F calculation unit 40 to the four respective dampers in such a manner that the control value for the FR damper is calculated by the equation, i.e. bounce value (bounce velocity×bounce gain)+roll value (roll velocity×roll gain)+pitch value (pitch velocity×pitch gain), the control value for the FL damper is calculated by the equation, i.e. bounce value−roll value+pitch value, the control value for the RR damper is calculated by the equation, i.e. bounce value+roll value−pitch value, and the control value for the RL damper is calculated by the equation, i.e. bounce value−roll value−pitch value. Then, the distribution unit transfers the calculated control values for the respective dampers to the Sky-hook determination unit 80 (step 509).

In the meantime, the FR G sensor 51 in the vehicle wheel sensor unit 50 is installed at the front right wheel to detect the vertical FR acceleration and provides the detected FR acceleration to the HPF 61 in the vehicle wheel vertical velocity calculation unit 60 (step 510). The FL G sensor 53 in the vehicle wheel sensor unit is installed at the front left wheel to detect the vertical FL acceleration and provides the detected FL acceleration to the HPF 61 in the vehicle wheel vertical velocity calculation unit (step 511).

The HPF 61 receives the vertical accelerations, i.e. the FR and FL accelerations, from the FR and FL G sensors 51 and 53, respectively, and performs the filtering operations for eliminating DC offsets from the respective received vertical accelerations to transfer the resultant accelerations to the rear wheel vertical acceleration estimation algorithm 63 (step 512).

The rear wheel vertical acceleration estimation algorithm 63 estimates the vertical RR and RL accelerations to transfer the estimated vertical RR and RL accelerations to the integrator 65 in such a manner that a time interval taken while a road input to the front wheel is delivered to the rear wheel at a current vehicle speed is first calculated using the current vehicle speed and the wheelbase (a distance between the front and rear wheels) and the vertical FR and FL accelerations from which the DC offsets have been eliminated by the HPF 61 are time delayed by the calculated time interval (step 513).

The integrator 65 calculates the vehicle wheel vertical velocities by integrating the vertical RR and RL accelerations, which have been estimated by the rear wheel vertical acceleration estimation algorithm 63, and the high-pass filtered vertical FR and FL accelerations, and then transfers the calculated vertical velocities to the damper velocity calculation unit 70 (step 514).

The damper velocity calculation unit 70 receives the vehicle body vertical velocities integrated by the integrator 25 in the vehicle body vertical velocity calculation unit 20 and the vehicle wheel vertical velocities integrated by the integrator 65 in the vehicle wheel vertical velocity calculation unit 60, and then calculates the damper velocities according to the aforementioned equation (1) to transfer the calculated damper velocities to the Sky-hook determination unit 80 (step 515).

The Sky-hook determination unit 80 determines the resultant control values based on the damper velocities provided form the damper velocity calculation unit 70 and the control values for the respective dampers distributed by the four-wheel distribution unit 45. Then, as shown in FIG. 4, the resultant control values are provided to the dampers to perform the damper control only when the dampers are extended such that the vehicle body is raised or the dampers are compressed such that the vehicle body is lowered (step 516).

Therefore, only the two FR and FL G sensors 51 and 53 installed at the front wheels can be used to control the rear wheel variable dampers by using the rear wheel vertical accelerations estimated from the front wheel vertical accelerations based on the fact that the time delay between the front and rear wheels can be determined by the vehicle speed and wheelbase. Accordingly, the Sky-hook determination can be more accurately made. Further, since it is not necessary to use all the four sensors, the number of parts of vehicles can be reduced when mass-producing the vehicles. Consequently, the selling prices for finished vehicles can be lowered, and thus, an unnecessary economical burden cannot be imposed on the consumers.

As described above, only the two FR and FL G sensors installed at the front wheels can be used to control the rear wheel variable dampers by using the rear wheel vertical accelerations estimated from the front wheel vertical accelerations based on the fact that the time delay between the front and rear wheels can be determined by the vehicle speed and wheelbase. Accordingly, the Sky-hook determination can be more accurately made. Further, since it is not necessary to use all the four sensors, the number of parts can be reduced when mass-producing the vehicles. Consequently, the selling prices for finished vehicles can be lowered, and thus, an unnecessary economical burden cannot be imposed on the consumers. It will be apparent to those skilled in the art that various modifications or changes can be made thereto within the scope of the fundamental technical spirit of the present invention. The true scope of the present invention should be construed on the basis of the appended claims.

What is claimed is:

1. A method for controlling a variable damper in a vehicle, comprising the steps of:
   (a) detecting vehicle body accelerations of selected three points among front right, front left, rear right and rear left;
   (b) calculating vehicle body acceleration of the remaining one point among front right, front left, rear right and rear left based on the detected vehicle body accelerations of the selected points according to a geometric rule;
   (c) calculating vehicle body vertical velocities by filtering the vehicle body accelerations to eliminate DC offsets therefrom and integrating the filtered accelerations;
   (d) detecting accelerations of front right/left vehicle wheels;
   (e) calculating front wheel vertical velocities by filtering the detected accelerations of the front right/left wheels to eliminate DC offsets therefrom and integrating the filtered accelerations;
   (f) calculating accelerations of rear wheels by time delaying the accelerations of the front wheels by a time interval taken while a road input to the front wheel is delivered to the rear wheel at a vehicle speed;
   (g) calculating damper velocities based on the calculated vehicle body vertical velocities and the calculated vehicle wheel vertical velocities;
   (h) eliminating high frequency components from bounce, roll and pitch velocities for the respective vehicle body vertical velocities calculated in steps (a) to (c);
   (i) calculating control values for the bounce, roll and pitch velocities by multiplying the bounce, roll and pitch velocities by the vehicle speed and road conditions;
   (j) distributing the control values for the bounce, roll and pitch velocities to the four dampers to calculate control values for the respective dampers according to a gain;
   (k) determining the control values for the respective dampers based on the damper velocities and the control values for the respective dampers and then providing the control values to the dampers only when the dampers are extended and the vehicle body is thus raised or when the dampers are compressed and the vehicle body is thus lowered.

* * * * *